United States Patent [19]

Rubens

[11] 3,960,784

[45] June 1, 1976

[54] BODIES OF EXPANDABLE SYNTHETIC RESINS AND METHOD OF PREPARATION

[75] Inventor: Louis C. Rubens, Midland, Mich.

[73] Assignee: The Dow Chemical Company, Midland, Mich.

[22] Filed: Nov. 17, 1971

[21] Appl. No.: 199,772

[52] U.S. Cl. .................. 260/2.5 B; 260/2.5 EP; 260/2.5 EV; 260/836; 526/17; 526/24; 526/78; 526/237; 526/291; 526/347

[51] Int. Cl.$^2$ .................................... C08J 9/18

[58] Field of Search ............... 260/2.5 EP, 2.5 B

[56] References Cited
UNITED STATES PATENTS

| | | | |
|---|---|---|---|
| 2,848,427 | 8/1958 | Rubens | 260/2.5 B |
| 2,893,963 | 7/1959 | Cleland et al. | 260/2.5 B |
| 3,098,831 | 7/1963 | Carr | 260/2.5 B |
| 3,098,832 | 7/1963 | Pooley et al. | 260/2.5 B |
| 3,259,594 | 7/1966 | Wright | 260/2.5 B |
| 3,259,595 | 7/1966 | Wright | 260/2.5 B |
| 3,282,863 | 11/1966 | Carey et al. | 260/2.5 EP |

*Primary Examiner*—Morton Foelak
*Attorney, Agent, or Firm*—Robert B. Ingraham

[57] ABSTRACT

Expandable synthetic resinous bodies which are capable of being expanded to thermal collapse-resistant foams are prepared by impregnating a thermoplastic synthetic resinous body with a blowing or expanding agent and a cross-linking agent. Such impregnation can readily be carried out without the aid of an aqueous suspension.

15 Claims, No Drawings

BODIES OF EXPANDABLE SYNTHETIC RESINS AND METHOD OF PREPARATION

Expandable synthetic resinous compositions in general are being prepared by admixing an expanding agent such as a volatile fluid with a heat plastified resin in an extruder and extruding below the foaming temperature to provide expandable granules, or by impregnating granules in an aqueous suspension with a foaming agent at elevated temperatures. A particularly desirable variety of expandable synthetic resinous material are those which are slightly cross-linked. Such polymers are well known in the art and are described in U.S. Letters Pat. No. 2,848,427 and 2,848,428. These polymers contain small amounts of cross-linking agent. For example: if styrene is the principle monomer, cross-linking is accomplished employing from about 0.01 to 0.25 weight percent divinylbenzene. Such foamable materials are particularly advantageous in that they are expandable into thermo-plastic, thermocollapse-resistant foams. By "thermo-collapse-resistant" is meant a foam that will remain stable; that is, will not shrink or collapse when heated for 10 minutes at a temperature of at least 40° above the glass temperature of the non-crosslinked or linear polymer. Generally in preparing such polymers, it is necessary to polymerize the monomer in the presence of a suitable amount of cross-linking agent which necessitates separate polymerization facilities for the preparation of such foams.

It would be highly desirable if such foams could be prepared directly from linear polymers which are not crosslinked, thus permitting great flexibility in the source of synthetic resin employed to make the polymer.

It would also be desirable if there were available an improved process for the manufacture of thermocollapse-resistant foams.

It would further be desirable if there were available an improved process for the manufacture of thermocollapse-resistant foams from linear; that is, non-crosslinked, polymers.

It would also be desirable if there were available an improved process for the preparation of thermocollapse-resistant foams which did not require the use of an aqueous suspension or the extrusion of a foamable composition.

These benefits and other advantages in accordance with the present invention are achieved in a method for the preparation of thermocollapse-rssistant synthetic resinous foamable bodies, the steps of the method comprising subjecting a thermoplastic synthetic resinous body to an atmosphere of a volatile fluid expanding agent at a temperature and pressure sufficient to cause impregnation of the body by the foaming agent and introducing cross-linking means into the body to provide a desired degree of cross-linking within the resinous body and the product thereof.

The method of the invention may be practiced with any synthetic thermoplastic resin which can be used for the preparation of expandable synthetic resinous particles. Such resins are well known in the art and are described in U.S. Letters Pat. No. 2,744,291; 2,779,062; 2,787,809 and the like and the teachings thereof are herewith incorporated by reference thereto. A similarly wide variety of foaming agents may be employed, including volatile hydrocarbons, halohydrocarbons and the like. Such blowing agents are set forth in U.S. Pat. Nos. 2,848,427 and 2,848,428 and the teachings thereof are herewith incorporated by reference. Alkenyl aromatic resins are employed in the practice of the invention with particular benefit. By the term "alkenyl aromatic resin" is meant a solid polymer of one or more polymerizable alkenyl aromatic compounds. The polymer or copolymer comprises, in chemically combined form, at least 50 percent by weight of at least one alkenyl aromatic compound having the general formula:

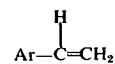

wherein "Ar" represents an aromatic hydrocarbon radical, or an aromatic halohydrocarbon radical of the benzene series. Examples of such alkenyl aromatic resins are the solid homopolymers of styrene, ortho-methylstyrene, meta-methylstyrene, para-methylstyrene, ar-ethylstyrene, ar-vinylxylene, ar-chlorostyrene, or ar-bromostyrene; the solid copolymers of two or more of such alkenyl aromatic compounds with minor amounts of other readily polymerizable olefinic compounds such as methylmethacrylate, acrylonitrile, and the like.

Cross-linking of the polymer is most advantageously introduced during impregnation with the blowing agent and may be induced by well known cross-linking means for preformed polymers; that is, methods and means which are capable of introducing into a mass or body of linear polymer cross-linkages. Cross-linking materials for various polymer systems are well known in the art and are discussed at great length in The Encyclopedia of Polymer Science & Technology, Volume 7, pages 331–414, John Wiley & Sonc, Inc., 1966, which is herewith incorporated by reference. For example: employing polystyrene, suitable multi-functional cross-linking compounds are dipropylene glycol, bis(-chloromethyl)biphenyl oxide epoxy resins such as the polyglycidyl ether of Bisphenol A; whereas suitable comonomers to provide reactive sites for cross-linking are vinylbenzyl chloride, glycidyl methacrylate and the like.

By way of further illustration, the alkenyl aromatic resinous polymers are readily cross-linked by introducing a Friedel Crafts catalyst such as boron trifluoride into the polymer with the introduction of the blowing agent, thereby providing simultaneous impregnation and cross-linking. If desired, a reactive agent is incorporated within the molecules of the polymer body by either copolymerization during formation of the polymer or by addition prior to impregnation with the blowing agent and a suitable catalyst or similar material to promote cross-linking. For example: alkenyl aromatic resins such as polystyrene are mixed in a melt or heat plastified condition with an agent which can be caused to effect cross-linking, or a chemically reactive monomer or polymer may be incorporated during or after polymerization. Utilizing polystyrene, compounds such as dipropylene glycol, bis(chloromethyl)biphenyl oxide are employed. Suitable comonomers which provide active sites for cross-linking when polymerized with alkenyl aromatic monomers such as styrene, include vinylbenzyl chloride, glycidyl methacrylate and the like. Other reactive compounds include the so-called epoxy resins beneficially of low molecular weight which, on the introduction of a suitable catalyst such as borontrifluoride, will provide the desired cross-linking function. Chlorides such as vinylbenzyl chloride provide active cross-linking sites which are useful with basic catalysts such as organic amines, typically diethyl amine. Epoxy resins which are particularly suitable for use with styrene polymer systems include liquid epoxy resins such as the diglycidyl ether of bisphenol A which readily respond with a Friedel Crafts catalyst to provide cross-linking which may occur either before or during impregnation of the blowing agent. Beneficially, cross-linking of the polymer is carried out at a temperature of from about −20°C. to +40°C. of the glass temperature of the polymer being treated. Such cross-linking may be carried out employing a suspending medium which is non-reactive with the cross-linking means and is saturated with the blowing agent being impregnated. However, it is particularly advantageous to conduct the cross-linking and impregnation simultaneously under generally anhydrous conditions and in the absence of a liquid suspending medium, and preferably under conditions which prevent the adhesion of particles of the polymer together. For example, employing polystyrene and styrene polymers having polymerized therein minor amounts of a comonomer, temperatures of from about 60°C. to 120°C. are beneficial, and preferably from about 70°C. to 100°C. The particles of bodies being impregnated may be individually supported during impregnation such as on a screen or tumbled in the presence of an anti-sticking agent such as finely divided talc or sodium chloride which is readily removed by water washing after the impregnation is complete. Generally it is desirable that such washing be done at a temperature below the temperature at which the particles foam.

Beneficially, the particles which are treated in accordance with the present invention may be of any desired shape. However, for most applications it is beneficial to employ generally spherical particles. Such particles should have a minimum dimension of about 0.05 millimeter and usually it is undesirable to employ particles larger than about 5 millimeters. For most applications, particles from about 0.5 to about 3 millimeters in diameter are most advantageous.

The suitability of any particular cross-linking means for any particular polymer at a desired operating temperature is readily determined by dissolving a base polymer such as polystyrene in a suitable solvent; e.g., toluene, and depositing a film on a glass or other rigid substrate which is unaffected by the solvent, removing the solvent to leave a continuous film of about 10 to 15 microns in thickness, subjecting the supported film to blowing agent and cross-linking agent for a period of time and subjecting the treated film to a solvent for the uncrosslinked polymer and observing the increase in weight or thickness of the solvent swollen film. If the film increases in weight or volume from 5 to 50 times, the cross-linking agent and conditions are suitable for the practice of the invention. The amount of cross-linking introduced under conditions which cause the polymer film to become insoluble, that is, to exhibit a swelling or weight increase of about 40 to 50 in a good solvent rather than form a clear solution, is twice the amount required for the practice of the invention. Therefore the amount of cross-linking means suitable is from about one-half that required to provide a weight or volume increase of 40 to 50 volumes to the amount required to provide a swollen volume of about 5. When the density of the solvent and polymer are about the same swelling volumes can be used instead of weight.

The following Examples serve to illustrate the invention but should not be considered as limiting thereto.

EXAMPLE 1

A plurality of styrene polymer discs are prepared by polymerizing a monomeric mixture in polytetrafluoroethylene molds at 80°C. for 24 hours and an additional 4 hours at 100°C. The discs have a diameter of 10 millimeters and a thickness of 1 millimeter. The monomeric mixture contains 0.5 weight percent benzoyl peroxide, based on the weight of the total monomer. The monomeric compounds are set forth in Table I which follows.

Table I

| Run | % Styrene | % Vinylbenzyl chloride | |
|---|---|---|---|
| 1 | 100 | 0 | |
| 2 | 99.95 | 0.05 | |
| 3 | 99.9 | 0.1 | Polymerization |
| 4 | 99.8 | 0.2 | initiator in all |
| 5 | 99.6 | 0.4 | samples |
| 6 | 99.4 | 0.6 | 0.5% benzoyl |
| 7 | 99.2 | 0.8 | peroxide based |
| 8 | 99.0 | 1.0 | upon total |
| 9 | 98.5 | 1.5 | monomer. |
| 10 | 97.5 | 2.0 | |
| 11 | 96.0 | 4.0 | |

In each of the discs two small holes are drilled which are holes diametrically opposed and the discs are strung on fine wires employing 2 millimeter glass beads as separators. Six discs of each composition are employed and the wires twisted together between each group of 6 discs. An 86 cubic centimeter glass ampoule having a length of about 12 inches and ¾ inch inside diameter is charged with 8 cubic centimeters of dichlorodifluoromethane at a temperature of −50°C. Boron trifluoride gas is bubbled into the dichlorodifluoromethane for a period of about 2 minutes, a length of time sufficient to observe a fog at the mouth of the ampoule. The assemblies of polymer discs are then placed in the ampoule and the ampoule sealed. The ampoule is then attached to the rim of a 20 inch diameter wheel rotating at about 10 revolutions per minute in a 70°C. water bath for a period of 24 hours. On removal of the ampoule from the water bath, the discs of Sample 1; that is, 100 percent polystyrene, and of Sample 2, styrene containing 0.05 precent vinylbenzyl chloride, are distorted and the discs of Sample 1 have fused together. Samples 3, 4 and 5 containing from 0.1 to 0.4 percent vinylbenzyl chloride have distorted slightly but have not fused together. With the remaining discs there is little or no distortion and no evidence of flow. The impregnated samples are tested for blowing agent concentration by determining volatile loss by heating under a pressure of 1 millimeter mercury for 3 hours at 175°C. The solubility in toluene is expressed as either total solubility or the swelling ratio; that is, the weight of the toluene swollen gel to the original polymer weight, and the foaming behavior in an air oven at 125°C. is expressed as the ratio of the foam volume to the initial solid body(Vf/Vs). These results are set forth in Table II which follows.

TABLE II

| Run Polym. No. (from Table I) | Wt. % Volatile | Solubility in toluene *(Wg/Ws) | Foaming at 125°C (Vf/Vs) | | | | |
|---|---|---|---|---|---|---|---|
| | | | 0 | 1 | 2 | 5 | 10 | 20 mins. |
| 1 | 13.9 | soluble | 1 | 26 | 10 | 5 | 4 | 3 |
| 2 | 14.1 | soluble | 1 | 22 | 11 | 5 | 4 | 4 |
| 3 | 13.2 | partly sol. | No foaming data | | | | | |
| 4 | 12.9 | partly sol. | 1 | 22 | 29 | 35 | 43 | 54 |
| 5 | 13.4 | partly sol. | 1 | 18 | 21 | 30 | 40 | 47 |
| 6 | 13.6 | partly sol. | No foaming data | | | | | |
| 7 | 13.9 | partly sol. | 1 | 27 | 33 | 43 | 53 | 43 |
| 8 | 12.9 | 17.6 | 1 | 31 | 37 | 45 | 55 | 67 |
| 9 | 13.2 | 13.9 | 1 | 19 | 22 | 28 | 32 | 36 |
| 10 | 12.6 | 9.9 | 1 | 13 | 16 | 20 | 22 | 25 |
| 11 | 14.0 | 5.3 | 1 | 11 | 14 | 17 | 18 | 18 |

*Weight of solvent swollen gel/weight of expandable particle

EXAMPLE 2

A plurality of discs are prepared as in Example 1 (Table I) and impregnated with a mixture of 99 parts of dichlorodifluoromethane plus one part by weight of dimethylamine. On impregnation, distortion occurs with samples containing up to 1.5 percent vinylbenzyl chloride. No change is observed for the discs containing greater than 2.5 percent vinylbenzyl chloride. Percent volatiles, solubility in toluene and foaming behavior are determined in the manner of Example 1 and are set forth in Table III which follows.

Table III

| Run Polym. No. from Table I) | Wt. % Volatile | Solubility in toluene (Wg/Ws) | Foaming at 125°C (Vf/Vs) | | | | |
|---|---|---|---|---|---|---|---|
| | | | 0 | 1 | 2 | 5 | 10 | 20 mins. |
| 1 | 14.3 | soluble | 1 | 18 | 8 | 4 | 4 | 3 |
| 8 | 11.2 | soluble | 1 | 16 | 8 | 5 | 4 | 4 |
| 9 | 14.2 | soluble | 1 | 24 | 17 | 8 | 5 | 5 |
| 10 | 12.2 | partly sol. | 1 | 31 | 34 | 40 | 35 | 17 |
| 11 | 12.5 | 12.7 | 1 | 13 | 26 | 46 | 61 | 80 |

For purposes of comparison, styrene polymer discs are impregnated with dichlorodifluoromethane without the aid of the cross-linking agent such as boron trifluoride or dimethyl amine. All samples soften, distort and fuse together during pressurization. Percent volatiles, solubility in toluene and foaming characteristics are determined and are set forth in Table IV below.

Table IV

| Run Polym. No. (from Table I) | Wt % Volatile | Solubility in toluene | Foaming at 125°C (Vf/Vs) | | | | |
|---|---|---|---|---|---|---|---|
| | | | 0 | 1 | 2 | 5 | 10 | 20 mins. |
| 1 | 13.7 | soluble | 1 | 24 | 9 | 5 | 4 | 3 |
| 8 | 12.9 | soluble | 1 | 22 | 8 | 4 | 4 | 3 |
| 9 | 13.2 | soluble | 1 | 27 | 7 | 5 | 4 | 3 |
| 10 | 11.6 | soluble | 1 | 23 | 9 | 4 | 4 | 3 |
| 11 | 14.0 | soluble | 1 | 20 | 7 | 4 | 3 | 3 |

EXAMPLE 3

A 25 gallon glass-lined reactor equipped with a loop agitator is charged with 75 pounds of an aqueous phase consisting of 1 percent hydroxymethylcellulose as a suspending agent; 0.3 weight percent potassium dichromate as a water phase polymerization inhibitor and 98.7 weight percent water; 75 pounds of a monomer phase consisting of 99.5 weight percent of a mixture which is 99 weight percent styrene and 1 weight percent vinylbenzyl chloride and 0.5 percent benzoyl peroxide. The mixture is heated for 24 hours at 80°C. and further 10 hours at 100°C. with the agitator rotating at 80 revolutions per minute. The reactor is cooled and the contents discharged to provide a plurality of clear, hard beads having a particle size ranging from about 0.8 to 1.3 millimeters. Four portions of the beads, each weighing 29.6 grams, are placed in 86 cubic centimeter glass ampoules, the first portion containing 8 cubic centimeters of a mixture of dichlorodifluoromethane and boron trifluoride; the second portion containing 8 cubic centimeters of a mixture of isobutane plus boron trifluoride; the third being a duplicate of the second, and the fourth having only 8 cubic centimeters of dichlorodifluoromethane. After sealing the ampoule, impregnation of the beads is carried out by rotating the ampoules for 16 hours in a 70°C. water bath. The ampoules are cooled to room temperature, opened and 0.5 gram samples heated to 125°C. in an air oven and the relative foam volume after varying periods of time observed. The results are set forth in the following Table.

Table V

| No. | Foaming volume at 125°C. after | | | | | | | Cell Size |
|---|---|---|---|---|---|---|---|---|
| | 0 | 1 | 3 | 5 | 7.5 | 10 | 20 | 30 min. | |
| 1 | 1 | 36 | 56 | 71 | 80 | 88 | 102 | 99 | fine~0.1 mm |
| 2 | 1 | 40 | 52 | 68 | 83 | 100 | 146 | 162 | fine~0.1 mm |
| 3 | 1 | 28 | 44 | 55 | 66 | 74 | 102 | 120 | coarse~1 mm |
| 4 | 1 | 50 | 10 | 9 | 3 | 3 | | | fine 0.1 mm |

EXAMPLE 4

A portion of the impregnated beads prepared in Example 3 is melt extruded employing a Brabender extruder having a barrel temperature of 205°C. and a die temperature of 170°C. The product is continuous strands of polymer having diameters ranging from about 0.047 to about 0.060 inch. Two portions of the strands are placed in glass ampoules and impregnated with blowing agent for 72 hours at 70°C. The first ampoule contains 8 cubic centimeters of dichlorodifluoromethane and boron trifluoride; the second ampoule contains only 8 cubic centimeters of dichlorodifluoromethane. After cooling, the ampoules are opened and portions of the strand heated at 125°C. and the foaming characteristics observed. These characteristics are set forth in Table VI below.

Table VI

| No. | (Vf/Vs) Foam volume at 125°C. after | | | | | | 30 min. |
|---|---|---|---|---|---|---|---|
| | 0 | 1 | 2 | 5 | 10 | 20 | |
| 1 | 1 | 31 | 31 | 47 | 55 | 54 | 72 (fine cells) |
| 2 | 1 | 1.6 | 1.3 | 1.1 | 1.1 | 1.4 | 1.0 (fine cells) |

EXAMPLE 5

A portion of the unimpregnated beads of Example 3 are compression molded to form a 1 millimeter thick sheet employing a pressure of 5000 pounds per square inch and a temperature of 205°C. Samples of the molded sheet are impregnated with (1) a mixture of dichlorodifluoromethane plus boron trifluoride, and (2) dichlorodifluoromethane, impregnation being done at 70°C. for 72 hours. The sheet is then foamed in hot air at 125°C. and the foaming characteristics observed. The foaming characteristics are set forth in Table VII which follows:

Table VII

| No. | (Vf/Vs) Foam Volume at 125°C. after | | | | | | | |
|---|---|---|---|---|---|---|---|---|
|  | 0 | 1 | 2 | 3 | 5 | 10 | 20 | 30 min. |
| 1 | 1 | 11.6 | 34.8 | 41.6 | 49.2 | 67.2 | 101.2 | 140.0 |
| 2 | 1 | 2.5 | 14.3 | 25.1 | 13.1 | 5.6 | 5.0 | 4.4 |

EXAMPLE 6

A plurality of styrene polymers are prepared by polymerizing monomer compositions containing 0.5 weight percent benzoyl peroxide in 2 millimeter inside diameter glass ampoules for a period of 24 hours at a temperature of 80°C. followed by 5 hours at 100°C. The monomer compositions are set forth in Table VIII below.

Table VIII

| Sample | Weight % Styrene | Weight % glycidyl methacrylate (GMA) | |
|---|---|---|---|
| 1 | 100 | 0 | samples cont- |
| 2 | 99.9 | 0.1 | tained 0.5% benzoyl |
| 3 | 99.5 | 0.5 | peroxide ini- |
| 4 | 99.0 | 1.0 | tiator based |
| 5 | 98.5 | 1.5 | upon total |
| 6 | 98.0 | 2.0 | monomer weight. |
| 7 | 97.0 | 3.0 | |
| 8 | 96.0 | 4.0 | |

The resultant polymer rods are clear, hard and dissolve completely in toluene. A first portion of the rods are treated with a mixture of dichlorodifluoromethane and boron trifluoride prepared by bubbling boron trifluoride into 8 cubic centimeters of dichloro difluoromethane for 3 minutes at a temperature of −50°C. and a second portion of the rods are treated with 8 cubic centimeters of dichlorodifluoromethane in 86 cubic centimeter glass ampoules at 70°C. for 24 hours. The ampoules are cooled, opened and the rods removed. Portions of the rod are evaluated for toluene solubility and foam volume after 3 minutes at 125°C. The results are set forth in Table IX following:

Table IX

| Sample No. Composition from Table VIII | Impregnating composition | Solubility in toluene (Wg/Ws) | Foam Volume after 3 min. at 125°C. (Vf/Vs) |
|---|---|---|---|
| 1 | Pure CF₂Cl₂ | Soluble | 7 |
| 2 | ″ | ″ | 7 |
| 3 | ″ | ″ | 8 |
| 4 | ″ | ″ | 6 |
| 5 | ″ | ″ | 6 |
| 6 | ″ | ″ | 6 |
| 7 | ″ | ″ | 5 |
| 8 | ″ | ″ | 7 |
| 1 | CF₂Cl₂ + BF₃ | Soluble | 8 |
| 2 | ″ | ″ | 17 |
| 3 | ″ | Very highly swollen gel | 88 |
| 4 | ″ | Highly swollen gel | 43 |
| 5 | ″ | 18 | 25 |
| 6 | ″ | 9.7 | 13 |
| 7 | ″ | 6.4 | 10 |
| 8 | ″ | 5.8 | 7 |

EXAMPLE 7

In a manner similar to Example 6, a plurality of rods are prepared employing the compositions set forth in Table X below.

Table X

| Sample No. | Weight % Styrene | Weight % Dipropylene glycol (DPG) | |
|---|---|---|---|
| 1 | 100 | 0 | |
| 2 | 99.95 | 0.05 | Samples contained |
| 3 | 99.9 | 0.1 | 0.5% benzoyl |
| 4 | 99.8 | 0.2 | peroxide initiator |
| 5 | 99.6 | 0.4 | |
| 6 | 99.4 | 0.6 | |
| 7 | 99.2 | 0.8 | |

Samples of each of the rods are completely soluble in toluene. Each of the rods is a clear glassy solid. In the manner of Example 6, a first portion of the rods is impregnated with dichlorodifluoromethane and boron trifluoride and a second portion impregnated with pure dichlorodifluoromethane. Impregnation is accomplished in glass ampoules at 70°C. for 24 hours. The ampoules are cooled, opened and portions of the rods evaluated for solubility in toluene and foaming characteristics. The results are set forth in Table XI which follows.

Table XI

| Sample No. | Impregnating composition | Solubility in toluene (Wg/Ws) | Foam volume after 3 min. at 125°C. (Vf/Vs) |
|---|---|---|---|
| 1 | Pure CF₂Cl₂ | Soluble | 7 |
| 2 | ″ | ″ | 7 |
| 3 | ″ | ″ | 8 |
| 4 | ″ | ″ | 6 |
| 5 | ″ | ″ | 7 |
| 6 | ″ | ″ | 5 |
| 7 | ″ | ″ | 6 |
| 1 | CF₂Cl₂ + BF₃ | Soluble | 8 |
| 2 | ″ | ″ | 11 |
| 3 | ″ | ″ | 14 |
| 4 | ″ | ″ | 30 |
| 5 | ″ | Highly swollen gel | 75 |
| 6 | ″ | ″ | 60 |
| 7 | ″ | 28.5 | 58 |

Similar results are obtained by hot mixing dipropylene glycol into the molten polystyrene and extruding to give strands prior to impregnation. Similar results are also obtained when bis(chloromethyl) biphenyl oxide in polystyrene is hot mixed and extruded into strands prior to impregnation.

EXAMPLE 8

A plurality of ternary polymers of styrene vinyl benzyl chloride and beta-hydroxyethyl acrylate are prepared employing 0.5 weight percent benzoyl peroxide as initiator and polymerizing in one inch diameter glass ampoules at 80°C. for a period of 24 hours and further polymerization at 100°C. for an additional 5 hours. The polymers are hard and transparent and are compression molded into 1 millimeter thick sheets at a temperature of 200°C. and under a pressure of 5000 pounds per square inch. A plurality of one centimeter diameter discs are punched from the sheets for impregnation and foaming. The monomer compositions are set forth in Table XII below.

Table XII

| No. | Styrene (mole fract.) | VBC (mole fract.) | β OH ethyl acrylate (mole fract.) |
|---|---|---|---|
| 1 | 1.00 | 0.00 | 0.00 |
| 2 | 0.99 | 0.005 | 0.005 |
| 3 | 0.98 | 0.01 | 0.01 |
| 4 | 0.96 | 0.02 | 0.02 |

Table XII-continued

| No. | Styrene (mole fract.) | VBC (mole fract.) | β OH ethyl acrylate (mole fract.) |
|---|---|---|---|
| 5 | 0.94 | 0.03 | 0.03 |

The discs are strung on wires in the manner described in Example 1 and impregnated in 86 cubic centimeter glass ampoules containing 8 cubic centimeters of a mixture of 98 weight percent dichlorodifluoromethane and 2 percent ammonia. The ampoule is sealed and impregnation accomplished using the apparatus of Example 1 at 70°C. for a period of 64 hours. At the end of this time, the ampoule is cooled and opened. Samples 1, 2 and 3 are badly distorted. Samples 4 and 5 show no distortion. Discs are then placed in an air oven at 125°C. and the foaming characteristics observed. These characteristics are set forth in Table XIII below.

Table XIII

| No. | Vf/Vo after | | | | |
|---|---|---|---|---|---|
|  | 0 | 1 | 2 | 5 | 35 min. |
| 1 | 1 | 20 | 16 | 3 | 3 |
| 2 | 1 | 22 | 17 | 4 | 3 |
| 3 | 1 | 26 | 19 | 4 | 4 |
| 4 | 1 | 22 | — | 43 | 74 |
| 5 | 1 | 9 | — | 17 | 30 |

EXAMPLE 9

Commercial polystyrene molding granules are tumbled in a cone blender with a polydiglycidyl ether of bisphenol A having an epoxy equivalent weight of about 175, a viscosity at 25°C. of about 5000 centipoise and commercially available under the trade designation of DER 332. After several hours the polystyrene particles are covered with a thin layer of the liquid epoxy. These compositions are fed to a Brabender extruder mixer to homogeneously mix the two materials at a temperature of 200°C. The extruded mixture is cut into approximately spherical particles by a die face cutter as it emerges from a die opening. The particles pass through the holes of a 2.38 millimeter screen and are retained on a 2.00 millimeter screen. The composition of the samples used in this Example is given in the following Table.

Table XIV

| Run Number | Weight % Polystyrene | Weight % Diglycidyl ether of bisphenol A |
|---|---|---|
| 1 | 100 | 0.0 |
| 2 | 99.8 | 0.2 |
| 3 | 99.7 | 0.3 |
| 4 | 99.5 | 0.5 |
| 5 | 99.3 | 0.7 |

Particles from Runs 1–5 are heated to 70°C. for 64 hours in sealed glass ampoules rotating slowly in a water bath. Each ampoule contains 29.4 grams of the polymer composition and 8 cubic centimeters of isobutane into which boron trifluoride gas has been bubbled for about 3 minutes at −50°C. After cooling to about −50°C. the impregnated polymer samples are removed from the ampoules and the following data obtained.

Table XV

Volatile Content and Toluene Solubility of Isobutane + $BF_3$ Pressurized Samples

| Run No. | *Percent Volatile | Solubility in Toluene | |
|---|---|---|---|
| 1 | 10.7 | Soluble | |
| 2 | 10.7 | Soluble | |
| 3 | 11.5 | Swollen gel | Wg/Ws = 26.7 |
| 4 | 10.9 | Swollen gel | 19.2 |
| 5 | 10.7 | Swollen gel | 12.7 |

*Determined by weight loss at 3 hours at 175°C.

Samples of the impregnated particles were foamed in a hot air oven at 125°, 150° and 175°C. and the results are set forth in Table XVI.

Table XVI

| Run No. | Percent Epoxy | $V_{Foam}/V_{initial\ solid}$ or $V_F/V_G$ Minutes in Oven | | | | | |
|---|---|---|---|---|---|---|---|
|  |  | 1 | 3 | 5 | 10 | 20 | 30 |
| *125°C. Foaming Temperature* | | | | | | | |
| 1 | 0 | 41 | 54 | 39 | <20 | | |
| 2 | 0.2 | 44 | 61 | 56 | <28 | | |
| 3 | 0.3 | 30 | 50 | 60 | 84 | 119 | 142 |
| 4 | 0.5 | 38 | 54 | 63 | 86 | 117 | 147 |
| 5 | 0.7 | 20 | 35 | 39 | 46 | 57 | 61 |
| *150°C. Foaming Temperature* | | | | | | | |
| 6 | 0 | 33 | 6 | | | | |
| 7 | 0.2 | 24 | 4 | | | | |
| 8 | 0.3 | 54 | 75 | 92 | 114 | 121 | 123 |
| 9 | 0.5 | 61 | 78 | 95 | 136 | 146 | 158 |
| 10 | 0.7 | 39 | 46 | 50 | 56 | 56 | 46 |
| *175°C. Foaming Temperature* | | | | | | | |
| 11 | 0 | 2 | 1 | | | | |
| 12 | 0.2 | 2 | 1 | | | | |
| 13 | 0.3 | 64 | 78 | 85 | 88 | 85 | 78 |
| 14 | 0.5 | 63 | 82 | 99 | 93 | 96 | 92 |
| 15 | 0.7 | 45 | 49 | 49 | 36 | 24 | 15 |

In a manner similar to the foregoing examples, employing the swellability and solubility test herein-before delineated, a wide variety of thermocollapse resistant bodies are readily prepared.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A method for the preparation of thermocollapse resistant synthetic resinous foamable bodies, the steps of the method comprising subjecting a crosslinkable linear uncrosslinked thermoplastic synthetic resinous body to an atmosphere of a volatile fluid expanding agent at a temperature and pressure which swells but does not dissolve the body, the pressure and temperature being sufficient to cause impregnation of the body by the expanding agent, while introducing crosslinking means into the body to provide a desired degree of crosslinking within the resinous body.

2. The method of Claim 1 wherein the body has a minimum dimension of 50 microns.

3. The method of Claim 1 wherein the synthetic resinous foamable body is an alkenyl aromatic resin.

4. The method of claim 1 wherein the impregnation and introduction of crosslinking means into the body are conducted under conditions which, if a 10 to 15 micron thick film of the alkenyl aromatic resin is subjected to a like treatment and subjected to a solvent for the polymer, the polymer forms a swollen gel having a weight at least 5 times the original weight of the film and the amount of treatment is equal to at least one half the treatment required to obtain a film which on exposure to the solvent increases in weight about 50 times.

5. The method of claim 3 wherein the synthetic resinous body is an alkenyl aromatic resin in admixture with a minor proportion of an epoxy resin.

6. The method of claim 3 wherein the impregnation is generally anhydrous.

7. The method of claim 1 wherein the impregnation and introduction crosslinking of means are carried out at a temperature of from about −20° to +40° of the glass temperature of the uncrosslinked alkenyl aromatic resinous body.

8. The method of claim 3 wherein the crosslinking and impregnation are carried out at a temperature of from about 60°C. to 120°C.

9. The method of claim 1 wherein a plurality of synthetic resinous bodies are employed in admixture with a particulate antisticking agent.

10. A method for the preparation of thermocollapse resistant synthetic resinous foamable bodies, the steps of the method comprising
subjecting a thermoplastic synthetic resinous body of a copolymer of styrene and a crosslinkable amount of up to 4 percent vinyl benzyl chloride to an atmosphere of dichlorodifluoromethane at a temperature and pressure which swells but does not dissolve the body, the pressure and temperature being sufficient to cause impregnation of the body by the expanding agent while
introducing borontrifluoride into the body to provide a desired degree of crosslinking within the body.

11. A method for the preparation of thermocollapse resistant alkenyl aromatic resinous foamable bodies, the steps of the method comprising
subjecting a crosslinkable linear uncrosslinked thermoplastic alkenyl aromatic resinous body, wherein the body contains in chemically combined form at least 50 percent by weight of at least one alkenyl aromatic compound having the general formula

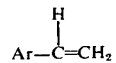

wherein Ar represents an aromatic hydrocarbon radical or an aromatic halohydrocarbon radical of the benzene series, to an atmosphere of a volatile fluid expanding agent at a temperature and pressure which swell but do not dissolve the body, the pressure and temperature being sufficient to cause impregnation of the body by the expanding agent while
introducing crosslinking into the body to provide a desired degree of crosslinking within the resinous body.

12. The method of claim 11 wherein the impregnation and crosslinking of the body are conducted under conditions which, if a 10 to 15 micron thick film of the alkenyl aromatic resin is subjected to a like treatment and subjected to a solvent for the polymer, the polymer forms a swollen gel having a weight at least 5 times the original weight of the film, the amount of treatment is equal to at least one half the treatment required to obtain a film which on exposure to the solvent increases in weight about 50 times.

13. The method of claim 11 wherein the impregnation and introduction crosslinking of means are carried out at a temperature of from about −20 to +40° of the glass temperature of the uncrosslinked alkenyl aromatic resinous body.

14. The method of claim 11 wherein the introduction crosslinking of means and impregnation are carried out at a temperature of from about 60°C. to 120°C.

15. The method of claim 11 wherein a plurality of synthetic resinous bodies are employed in admixture with a particulate antisticking agent.

* * * * *

UNITED STATES PATENT AND TRADEMARK OFFICE
CERTIFICATE OF CORRECTION

PATENT NO. : 3,960,784
DATED : June 1, 1976
INVENTOR(S) : Louis C. Rubens

It is certified that error appears in the above-identified patent and that said Letters Patent are hereby corrected as shown below:

Column 1, line 50, the word "rssitant" should read --resistant--;

Column 2, line 35, "Volume 7" should read --Volume 4--;

Column 2, line 36, "John Wiley & Sonc" should read --John Wiley & Sons--;

Column 3, line 26, "particles of" should read --particles or--;

Column 4, line 52, the word "precent" should read --percent--;

Column 5, line 68, "further 10 hours" should read --a further 10 hours--;

Column 11, line 13, "crosslinking of" should read --of cross-linking--;

Column 12, line 31, "crosslinking of" should read --of cross-linking--;

Column 12, line 36, "crosslinking of" should read --of cross-linking--.

Signed and Sealed this

Fifth Day of October 1976

[SEAL]

Attest:

RUTH C. MASON
*Attesting Officer*

C. MARSHALL DANN
*Commissioner of Patents and Trademarks*